(12) United States Patent
Wu

(10) Patent No.: US 8,512,840 B2
(45) Date of Patent: Aug. 20, 2013

(54) THERMOPLASTIC POLYIMIDE/POLYBENZIMIDAZOLE FUSER MEMBER

(75) Inventor: Jin Wu, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/297,566

(22) Filed: Nov. 16, 2011

(65) Prior Publication Data

US 2013/0122286 A1    May 16, 2013

(51) Int. Cl.
| | |
|---|---|
| *B32B 25/08* | (2006.01) |
| *B32B 25/20* | (2006.01) |
| *B32B 27/20* | (2006.01) |
| *B32B 27/34* | (2006.01) |
| *G03G 15/20* | (2006.01) |
| *B32B 1/08* | (2006.01) |

(52) U.S. Cl.
USPC ........ 428/36.91; 428/337; 428/421; 428/447; 428/448; 428/473.5; 399/333

(58) Field of Classification Search
None
See application file for complete search history.

(56) References Cited

U.S. PATENT DOCUMENTS

| | | | | |
|---|---|---|---|---|
| 4,973,629 | A * | 11/1990 | Williams et al. | 525/432 |
| 6,442,365 | B1 * | 8/2002 | Schlueter et al. | 399/328 |
| 2005/0045856 | A1 * | 3/2005 | Yoshikawa et al. | 252/500 |
| 2012/0183783 | A1 * | 7/2012 | Wu et al. | 428/422 |

* cited by examiner

*Primary Examiner* — Ramsey Zacharia
(74) *Attorney, Agent, or Firm* — Hoffman Warnick LLC

(57) ABSTRACT

The present teachings provide a fuser member. The fuser member includes a substrate layer comprising a thermoplastic polyimide/polybenzimidazole blend. A method of making the fuser member is provided.

17 Claims, 3 Drawing Sheets

THERMOPLASTIC POLYIMIDE/POLYBENZIMIDAZOLE FUSER MEMBER

BACKGROUND

1. Field of Use

This disclosure is generally directed to fuser members useful in electrophotographic imaging apparatuses, including digital, image on image, and the like. In addition, the fuser member described herein can also be used in a transfix apparatus in a solid ink jet printing machine.

2. Background

Thermoset polyimide (PI) is commonly used as a fuser belt substrate due to its high glass transition temperature, $T_g$, (about 370° C.) however, it is very expensive, and the curing process is long (at least 3 hours) and energy consuming (curing at over 300° C.).

Thus, there is high unit manufacturing cost associated with fuser substrates made of polyimide. There is a need to reduce the cost.

Thermoplastic polyimide does not possess the properties of thermoset polyimide. The highest $T_g$ of the thermoplastic polyimide materials available is about 300° C. Other materials used for fuser substrates can become brittle, resulting in unacceptable performance.

There is always a need to explore novel materials to replace thermoset polyimide for fuser belt substrate to reduce manufacturing cycle time and cost.

In addition, a polyimide fuser belt requires a modulus that is greater than 4,000 MPa. In embodiments, the onset decomposition temperature should be greater than 400° C. Such requirements, along with reduced cost of manufacturing, are desirable

SUMMARY

According to an embodiment, a fuser member is provided. The fuser member includes a substrate layer comprising a thermoplastic polyimide/polybenzimidazole blend.

According to another embodiment, there is described a fuser member including a substrate layer comprising a thermoplastic polyimide/polybenzimidazole blend. Disposed on the substrate layer is an intermediate layer comprising a material selected from the group consisting of silicone and fluoroelastomer. A fluoropolymer release layer is disposed on the intermediate layer.

According to another embodiment there is provided a fuser member comprising a substrate layer comprising a theremoplastic polyimide/polybenzimidazole blend wherein the thermoplastic polyimide is represented by the following structure:

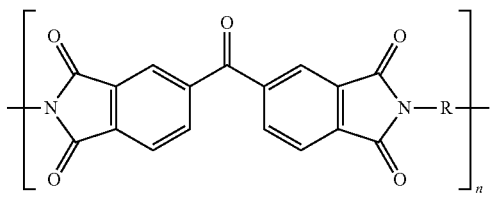

wherein R is aryl with from about 6 to about 36 carbon atoms, and n is the number of the repeating units of from about 50 to about 2,000 and wherein the polybenzimidazole is represented by the structure:

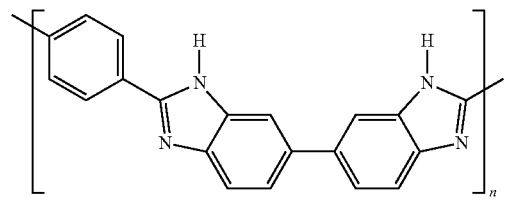

wherein n represents the number of repeating segments of from about 30 to about 500. The fuser member includes an intermediate layer comprising a material selected from the group consisting of silicone and fluoroelastomer and a release layer disposed on the intermediate layer comprising a fluoropolymer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
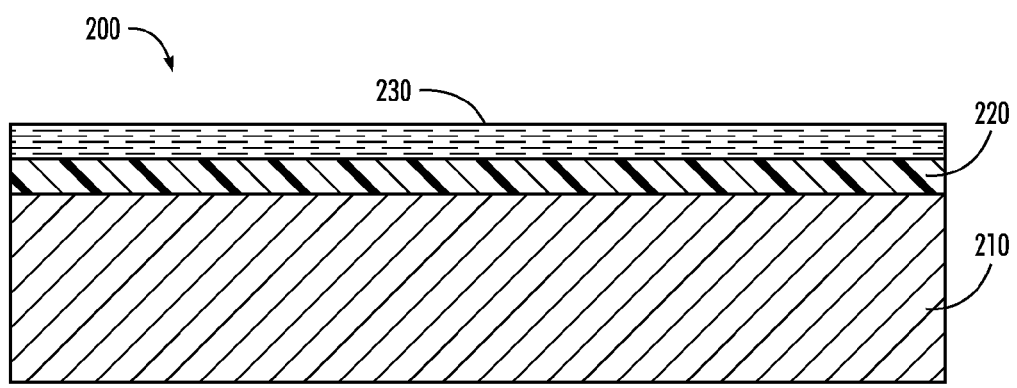
FIG. 1 depicts an exemplary fuser member having a belt substrate in accordance with the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Furthermore, to the extent that the terms "including", "includes", "having", "has", "with", or variants thereof are used in either the detailed description and the claims, such terms are intended to be inclusive in a manner similar to the term "comprising." The term "at least one of" is used to mean that one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The fuser or fixing member can include a substrate having one or more functional intermediate layers formed thereon. The substrate described herein includes a belt. The one or more intermediate layers include cushioning layers and release layers. Such a fuser member can be used as an oil-less fusing member for high speed, high quality electrophotographic printing to ensure and maintain a good toner release from the fused toner image on an image supporting material (e.g., a paper sheet), and further assist paper stripping.

In various embodiments, the fuser member can include, for example, a substrate, with one or more functional intermediate layers formed thereon. The substrate can be formed in various shapes, such as a belt, or a film, using suitable materials that are non-conductive or conductive depending on a specific configuration, for example, as shown in FIG. 1.

In FIG. 1, an exemplary embodiment of a fusing or transfix member 200 can include a belt substrate 210 with one or more functional intermediate layers, e.g., 220 and an outer surface layer 230 formed thereon. The outer surface layer 230 is also referred to as a release layer. The belt substrate 210 is described further and is made of a thermoplastic polyimide polymer and a polybenzimidazole.

Functional Intermediate Layer

Examples of materials used for the functional intermediate layer 220 (also referred to as cushioning layer or intermediate layer) include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Other examples of the materials suitable for use as functional intermediate layer 220 also include fluoroelastomers. Fluoroelastomers are from the class of 1) copolymers of two of vinylidenefluoride, hexafluoropropylene, and tetrafluoroethylene; such as those known commercially as VITON A®; 2) terpolymers of vinylidenefluoride, hexafluoropropylene, and tetrafluoroethylene known commercially as VITON B®; and 3) tetrapolymers of vinylidenefluoride, hexafluoropropylene, tetrafluoroethylene, and a cure site monomer those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS®, TH®, NH®, P757®, TNS®, T439®, PL958®, BR9151® and TN505®, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

The thickness of the functional intermediate layer 220 is from about 30 microns to about 1,000 microns, or from about 100 microns to about 800 microns, or from about 150 microns to about 500 microns.

Release Layer

An exemplary embodiment of a release layer 230 includes fluoropolymer particles. Fluoropolymer particles suitable for use in the formulation described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoropolymer particles provide chemical and thermal stability and have a low surface energy. The fluoropolymer particles have a melting temperature of from about 255° C. to about 360° C. or from about 280° C. to about 330° C. These particles are melted to form the release layer.

For the fuser member 200, the thickness of the outer surface layer or release layer 230 can be from about 10 microns to about 100 microns, or from about 20 microns to about 80 microns, or from about 40 microns to about 60 microns.

Adhesive Layer(s)

Optionally, any known and available suitable adhesive layer, also referred to as a primer layer, may be positioned between the release layer 230, the functional intermediate layer 220 and the substrate 210. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

Figure 2A:
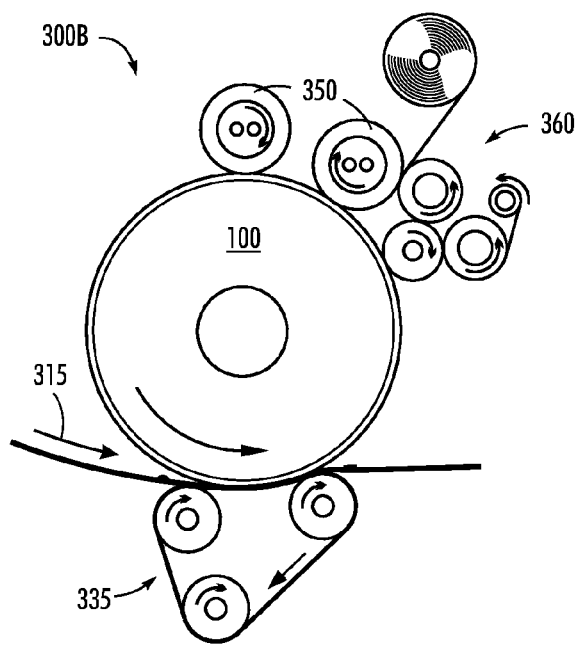
FIGS. 2A-2B depict exemplary fusing configurations using the fuser member shown in FIG. 1 in accordance with the present teachings.
Figure 2B:
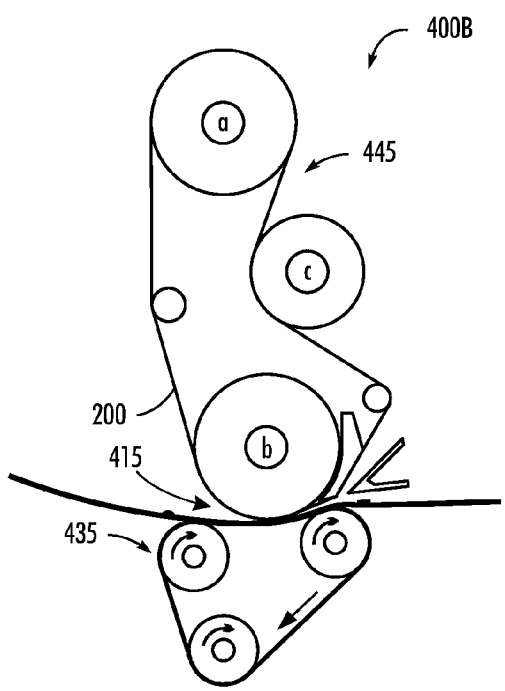

FIGS. 2A and 2B depict an exemplary fusing configuration for the fusing process in accordance with the present teachings. It should be readily apparent to one of ordinary skill in the art that the fusing configurations 300B and 400B depicted in FIGS. 2A-2B, respectively, represent generalized schematic illustrations and that other members/layers/substrates/ configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIG. 2A depicts the fusing configuration 300B using a fuser belt shown in FIG. 1 in accordance with the present teachings. The configuration 300B can include a fuser belt of FIG. 1 that forms a fuser nip with a pressure applying mechanism 335, such as a pressure belt, for an image supporting material 315. In various embodiments, the pressure applying mechanism 335 can be used in combination with a heat lamp (not shown) to provide both the pressure and heat for the fusing process of the toner particles on the image supporting material 315. In addition, the configuration 300B can include one or more external heat rolls 350 along with, e.g., a cleaning web 360, as shown in FIG. 2A.

FIG. 2B depicts the fusing configuration 400B using a fuser belt shown in FIG. 1 in accordance with the present teachings. The configuration 400B can include a fuser belt (i.e., 200 of FIG. 1) that forms a fuser nip with a pressure applying mechanism 435, such as a pressure belt in FIG. 2B, for a media substrate 415. In various embodiments, the pressure applying mechanism 435 can be used in a combination with a heat lamp to provide both the pressure and heat for the fusing process of the toner particles on the media substrate 415. In addition, the configuration 400B can include a mechanical system 445 to move the fuser belt 200 and thus fusing the toner particles and forming images on the media substrate 415. The mechanical system 445 can include one or more rolls 445a-c, which can also be used as heat rolls when needed.

Figure 3:
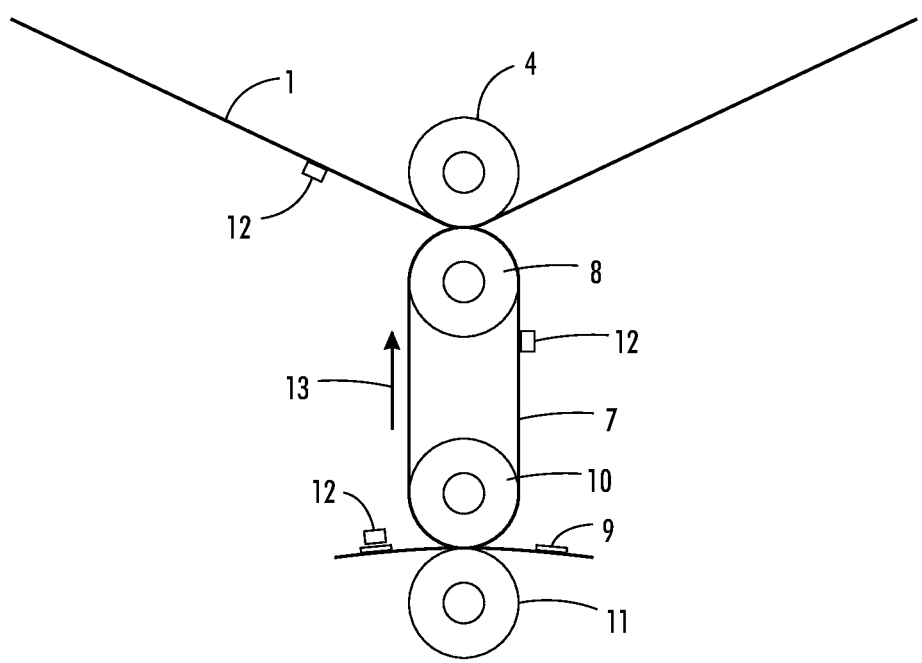
FIG. 3 depicts a fuser configuration using a transfix apparatus.

FIG. 3 demonstrates a view of an embodiment of a transfix member 7 which may be in the form of a belt, sheet, film, or like form. The transfix member 7 is constructed similarly to the fuser belt described above. The developed image 12 positioned on intermediate transfer member 1, is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

Substrate Layer

The substrate layer 210 disclosed herein is a composition comprising a thermoplastic polyimide and a polybenzimidazole.

The polyimide utilized for the preparation of the fuser members can be a polyimide homopolymer, a polyimide copolymer, a higher order polyimide polymer, or mixtures thereof. For example, the thermoplastic polyimides, available from HP Polymers Incorporated, can be represented by the following structures:

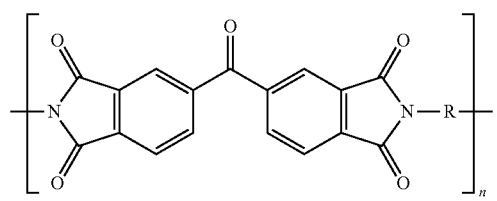

where R is aryl or substituted derivatives thereof with, for example, from about 6 to about 36 carbon atoms, from about 6 to about 24 carbon atoms, from about 6 to about 12 carbon atoms, or from about 12 to about 24 carbon atoms, and n represents the number of repeating units or segments. For example, n can be a number of from about 50 to about 2,000, from about 100 to about 1,000, from about 275 to about 700, from about 400 to about 600, or from about 150 to about 400.

Examples of specific suitable thermoplastic polyimides selected for the generation of the fuser member described herein include those represented by the following structures:

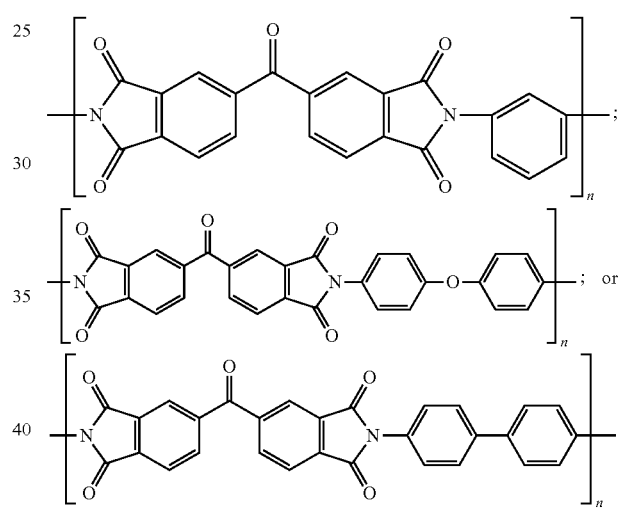

where n is a number as illustrated herein, or, for example, from about 50 to about 2,000, from about 100 to about 1,000, from about 275 to about 450, or from about 100 to about 375.

Thermoplastic polyimide copolymer examples that can be selected for the fuser members are represented by the following structures:

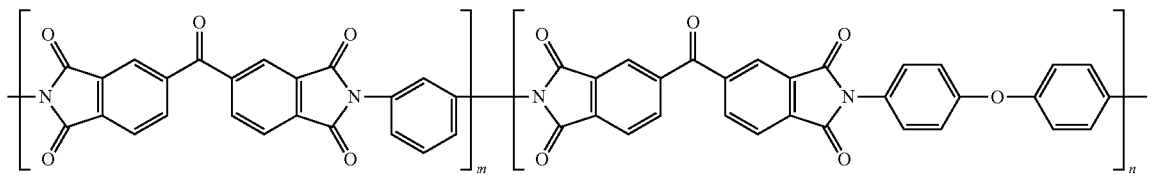

where each n and m represents the repeating unit or segment of from about 50 to about 2,000, or from about 100 to about 1,000.

The number average molecular weight of the disclosed thermoplastic polyimides can be, for example, from about 5,000 to about 50,000, from about 10,000 to about 35,000, from about 10,000 to about 25,000, or from about 15,000 to about 25,000, and the weight average molecular weight of the polyimide can be, for example, from about 10,000 to about 300,000, from about 10,000 to 200,000, from about 20,000 to about 150,000, or from about 50,000 to about 100,000, where the weight average molecular weights and number average molecular weights are determined by known methods, such as GPC analysis.

Glass transition temperatures, as determined by known DSC analysis of the polyimides illustrated herein, are, for example, from about 275° C. to about 335° C., from about 275° C. to about 315° C., or from about 290° C. to about 305° C.

The fuser members described herein also include a polybenzimidazole that is blended with or mixed with the polyimide. As the fuser member polybenzimidazole any suitable polybenzimidazole, or mixture of two, three, or more different polybenzimidazoles can be selected.

Examples of suitable polybenzimidazoles (PBI) that can be selected for the fuser member mixtures are represented by the following structures:

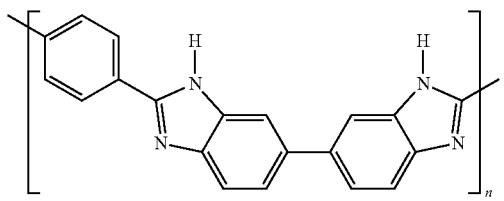

where n is, for example, a number of from about 10 to about 800, from about 30 to about 700, from about 30 to about 625, from about 30 to about 500, from about 100 to about 400, from about 100 to about 300, from about 200 to about 300, or from about 200 to about 700.

Commercially available polybenzimidazoles (PBI) are obtainable from Boedeker Plastics, Inc., Shiner, Tex. under the trade name of CELAZOLE®, and include, for example, a 26 weight percent PBI solution in N,N'-dimethylacetamide (DMAc).

In an embodiment, polybenzimidazoles can be prepared in accordance with the following reaction scheme where the value of n is as illustrated herein:

The number average molecular weight of the polybenzimidazole can be, for example, from about 2,000 to about 40,000, from about 3,000 to about 40,000, from about 10,000 to about 25,000, from about 5,000 to about 20,000, from about 9,000 to about 15,000, or from about 7,000 to about 15,000, and the weight average molecular weight of the polybenzimidazole can be, for example, from about 9,000 to about 150,000, from about 30,000 to about 120,000, from about 20,000 to about 120,000, from about 50,000 to about 100,000, or from about 60,000 to about 90,000 with the weight and number average molecular weight being determined by known methods, such as GPC analysis.

The glass transition temperature ($T_g$) of the polybenzimidazoles as determined by known DSC analysis can be, for example, from about 390° C. to about 420° C., from about 400° C. to about 415° C., from about 380° C. to about 420° C., or from about 395° C. to about 410° C.

For the fuser member comprising a blended mixture of the polyimide and the polybenzimidazole, the polyimide can be present in an amount of from about 1 to about 99 weight percent, from about 1 to about 95 weight percent, from about 25 to about 75 weight percent, from about 40 to about 60 weight percent, from about 2 to about 80 weight percent, from about 10 to about 70 weight percent, or about 50 weight percent based on a total solids, and the polybenzimidazole can be present in an amount of from about 99 to about 1 weight percent, from about 95 to about 1 weight percent, from about 80 to about 2 weight percent, from about 70 to about 10 weight percent, from about 75 to about 25 weight percent, from about 60 to about 40 weight percent, or about 50 weight percent based on the total solids.

In embodiments of the present disclosure, the fuser members illustrated herein can further include an optional additional polymeric binder. The additional polymeric binder can be included in the mixture of the polyimide and polybenzimidazole. Examples of suitable additional polymeric binders include a polycarbonate, a polyphenylene sulfide, a polyamide, a polysulfone, a polyetherimide, a polyamideimide, a polyester, a polyvinylidene fluoride, a polyethylene-co-polytetrafluoroethylene, and the like, and mixtures thereof.

When an additional polymeric binder is added to the mixture of the polyimide and the polybenzimidazole, it can be included in any desirable and effective amounts. For example, the additional polymeric binder can be present in an amount of from about 1 to about 25 weight percent, from about 1 to

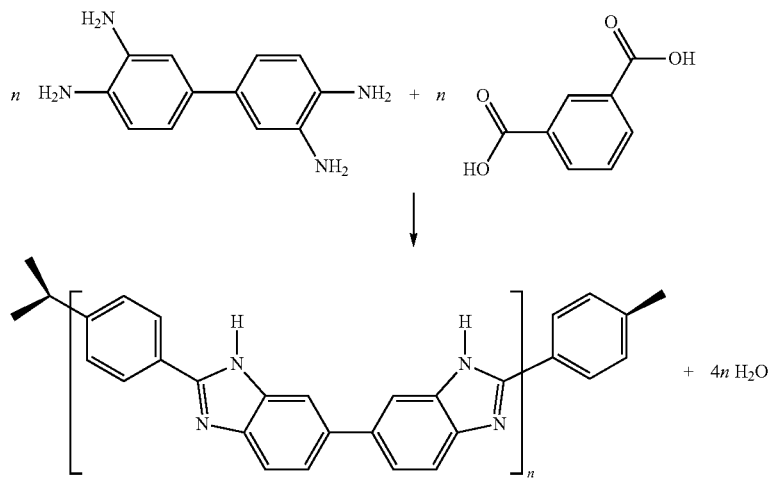

about 15 weight percent, or from about 1 to about 10 weight percent, based on the total solids.

The disclosed thermoplastic polyimide/polybenzimidazole substrate layer 210 possesses a Young's modulus of from about 4,000 MPa to about 10,000 MPa, or from about 5,000 MPa to about 9,000 MPa, or from about 6,000 MPA to about 8,000 MPa; and an onset decomposition temperature of from about 400° C. to about 600° C., or from about 425° C. to about 575° C., or from about 450° C. to about 550° C.

The polyimide and the polybenzimidazole mixture components can be formulated into a fuser member by any suitable method. For example, with known milling processes, uniform dispersions of the fuser member mixture can be obtained, and then coated on individual metal substrates, such as a stainless steel substrate, glass plates, or the like, using a known draw bar coating method. The resulting individual film or films can be cured and dried, such as by heating at from about 100° C. to about 250° C., or from about 150° C. to about 220° C., for a suitable period of time, such as from about 20 to about 120 minutes, or from about 40 to about 60 minutes, while remaining on the substrate. After drying and cooling to room temperature, about 23° C. to about 25° C., the films resulting can be removed from the substrates by known processes, such as by hand peeling. The resultant films can have a thickness of, for example, from about 15 to about 150 microns, from about 20 to about 100 microns, from about 40 to about 80 microns, or from about 25 to about 75 microns.

As metal substrates selected for the deposition of the polyimide, and the polybenzimidazole containing mixture and filler or fillers disclosed herein, there can be selected stainless steel, aluminum, nickel, copper, and their alloys, or other conventional materials. Other suitable substrates that can be used include glass plates, and the like.

Examples of solvents selected for formation of the polyimide, the polybenzimidazole, and optional filler component, which solvents can be selected in an amount of from about 60 to about 95 weight percent, or from about 70 to about 90 weight percent of the total solids coating dispersion, include alkylene halides such as methylene chloride, tetrahydrofuran, toluene, monochlorobenzene, N-methyl-2-pyrrolidone (NMP), N,N-dimethylformamide, N,N-dimethylacetamide (DMAc), methyl ethyl ketone, methyl isobutyl ketone, mixtures thereof, and the like.

Additives and additional conductive or non-conductive fillers may be present in the above-described composition. In various embodiments, other filler materials or additives including, for example, inorganic particles, can be used for the coating composition and the subsequently formed surface layer. Fillers used herein include carbon blacks such aluminum nitride, boron nitride, aluminum oxide, graphite, graphene, copper flake, nano diamond, carbon black, carbon nanotubes, metal oxides, doped metal oxide, metal flake, and mixtures thereof. In various embodiments, other additives known to one of ordinary skill in the art can also be included to form the disclosed composite materials.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Experimentally, a thermoplastic polyimide/PBI solution was prepared in NMP/DMAc at about 18 weight percent solids with a thermoplastic polyimide/PBI ratio of about 70/30. The solution was coated on a glass plate using a draw bar coater, and subsequently cured at 190° C. for 1 hour. The thermoplastic polyimide/PBI film obtained had thickness of about 80 μm.

The thermoplastic polyimide/PBI belt was further tested for Young's modulus, and onset decomposition temperature. The modulus was about 6,600 MPa, and the onset decomposition temperature was about 520° C. As comparison, commercially available thermoset polyimide belts have a modulus of about 6,000 MPa, and the onset decomposition temperature is about 530° C.

When compared with the more costly thermoset polyimide fuser belt substrate curing process (at least 3 hours, at a curing temperature above 320° C.), the disclosed thermoplastic polyimide/PBI blend fuser belt substrate is cured at 190° C. for 1 hour, and thus significantly reduces manufacturing cost and cycle time. The fuser member described herein provides an alternative to a thermoset polyimide fuser belt substrate alternative. The fuser member described herein provides a reduced manufacturing cost and cycle time with properties comparable to that of a thermoset polyimide belt.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A fuser member comprising:
   a substrate layer comprising a thermoplastic polyimide/polybenzimidazole blend, wherein the substrate layer has Young's modulus of greater than 4000 MPa and a onset decomposition temperature of greater than 400° C.;
   an intermediate layer disposed on the substrate layer; and
   a release layer disposed on the intermediate layer.

2. The fuser member of claim 1 wherein the thermoplastic polyimide is represented by the following structure:

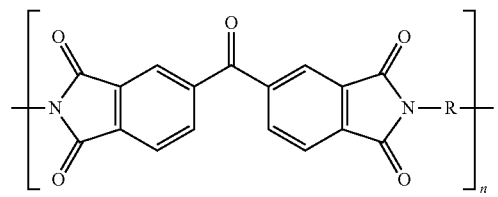

wherein R is aryl with from about 6 to about 36 carbon atoms, and n is the number of the repeating units of from about 50 to about 2,000.

3. The fuser member of claim 2 wherein R is aryl with from about 6 to about 24 carbon atoms, and n is the number of the repeating units of from about 100 to about 1,000.

4. The fuser member of claim 1 wherein said thermoplastic polyimide is selected from the group consisting of those represented by one of the following structures

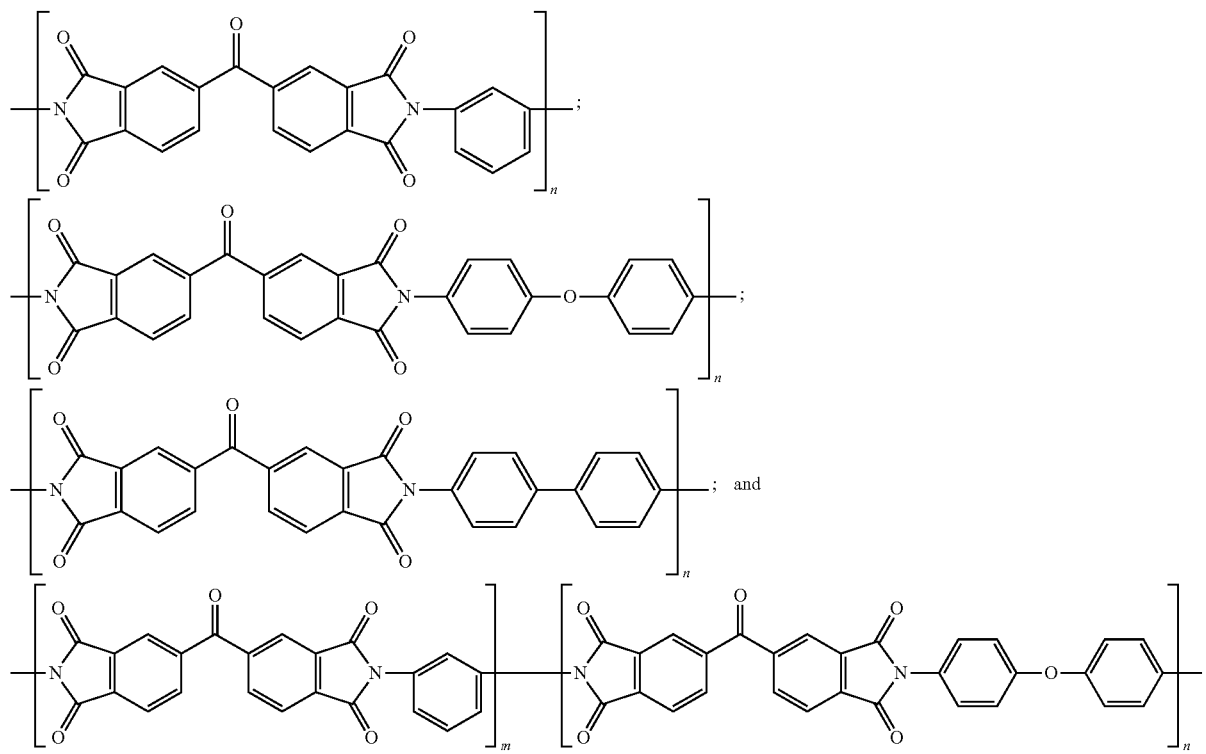

wherein each n and m represents the number of repeating units of from about 50 to about 2,000; and wherein said polybenzimidazole is represented by the following structures:

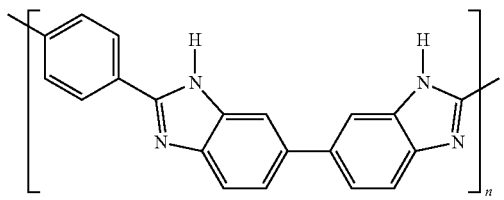

wherein n represents the number of repeating segments of from about 30 to about 500.

5. The fuser member of claim 1 wherein the polybenzimidazole is represented by the structure:

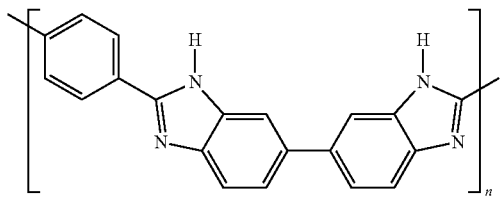

wherein n represents the number of repeating segments of from about 30 to about 500.

6. The fuser member of claim 1 wherein the substrate layer further comprises fillers.

7. The fuser member of claim 6 wherein the fillers are selected from the group consisting of aluminum nitride, boron nitride, aluminum oxide, graphite, graphene, copper flake, nano diamond, carbon black, carbon nanotubes, metal oxides, doped metal oxide, metal flake, and mixtures thereof.

8. The fuser member of claim 1, wherein the intermediate layer comprises silicone.

9. The fuser member of claim 1, wherein the release layer comprises a fluoropolymer.

10. A fuser member comprising:
a substrate layer comprising a thermoplastic polyimide/polybenzimidazole blend, wherein the substrate layer has Young's modulus of greater than 4000 MPa and a onset decomposition temperature of greater than 400° C.;
an intermediate layer comprising a material selected from the group consisting of silicone and fluoroelastomer; and
a release layer disposed on the intermediate layer comprising a fluoropolymer.

11. The fuser member of claim 10 wherein the release layer further comprises fillers selected from the group consisting of aluminum nitride, boron nitride, aluminum oxide, graphite, graphene, copper flake, nano diamond, carbon black, carbon nanotube, metal oxides, doped metal oxide, metal flake, and mixtures thereof; and wherein the fluoropolymer comprises a fluoroelastomer or a fluoroplastic.

12. The fuser member of claim 10 further comprising:
an adhesive layer disposed on the intermediate layer or the substrate layer.

13. The fuser member of claim 10 wherein the thermoplastic polyimide is represented by the following structure:

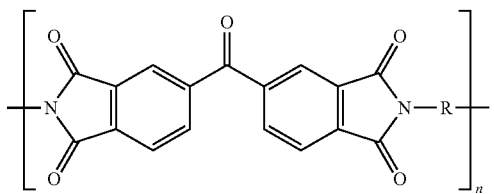

wherein R is aryl with from about 6 to about 36 carbon atoms, and n is the number of the repeating units of from about 50 to about 2,000.

14. The fuser member of claim 10 wherein the polybenzimidazole is represented by the structure:

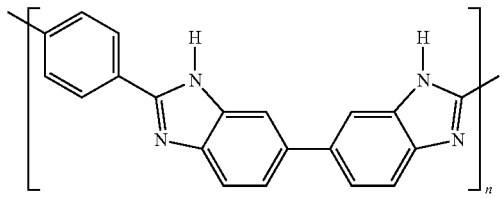

wherein n represents the number of repeating segments of from about 30 to about 500.

15. A fuser member comprising:
a substrate layer comprising a theremoplastic polyimide/polybenzimidazole blend wherein the thermoplastic polyimide is represented by the following structure:

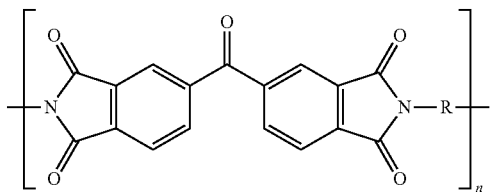

wherein R is aryl with from about 6 to about 36 carbon atoms, and n is the number of the repeating units of from about 50 to about 2,000 and wherein the polybenzimidazole is represented by the structure:

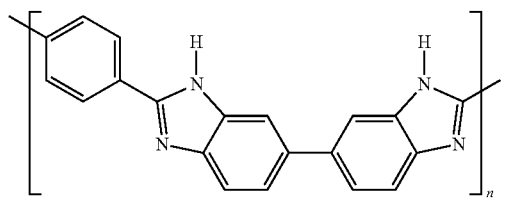

wherein n represents the number of repeating segments of from about 30 to about 500, wherein the substrate layer has Young's modulus of greater than 4000 MPa and a onset decomposition temperature of greater than 400° C.;
an intermediate layer comprising a material selected from the group consisting of silicone and fluoroelastomer; and
a release layer disposed on the intermediate layer comprising a fluoropolymer.

16. The fuser member of claim 15 wherein the thermoplastic polyimide is present in an amount of from about 1 to about 95 weight percent, and said polybenzimidazole is present in an amount of from about 1 to about 95 weight percent of the substrate layer.

17. The fuser member of claim 15 wherein the substrate layer comprises a thickness of from about 15 microns to about 150 microns.

* * * * *